(12) United States Patent
Nahmias Nanni et al.

(10) Patent No.: US 7,144,465 B2
(45) Date of Patent: *Dec. 5, 2006

(54) CROSSLINKABLE ELASTOMERIC COMPOSITION, TIRE INCLUDING A CROSSLINKED ELASTOMERIC MATERIAL, AND PROCESS FOR PRODUCING THE TIRE

(75) Inventors: Marco Nahmias Nanni, Milan (IT); Antonio Serra, Genoa (IT)

(73) Assignee: Pirelli Pneumatici S.p.A., Milan (IT)

( * ) Notice: Subject to any disclaimer, the term of this patent is extended or adjusted under 35 U.S.C. 154(b) by 117 days.

This patent is subject to a terminal disclaimer.

(21) Appl. No.: 10/468,355

(22) PCT Filed: Feb. 18, 2002

(86) PCT No.: PCT/EP02/01693

§ 371 (c)(1),
(2), (4) Date: Dec. 4, 2003

(87) PCT Pub. No.: WO02/068528

PCT Pub. Date: Sep. 6, 2002

(65) Prior Publication Data

US 2004/0099358 A1    May 27, 2004

Related U.S. Application Data

(60) Provisional application No. 60/272,308, filed on Mar. 2, 2001.

(30) Foreign Application Priority Data

Feb. 23, 2001  (EP)  .................. 01104646

(51) Int. Cl.
*B60C 1/00*    (2006.01)
*B29D 30/00*   (2006.01)

(52) U.S. Cl. ................ 156/110.1; 152/450; 152/209.1; 152/905

(58) Field of Classification Search .............. None
See application file for complete search history.

(56) References Cited

U.S. PATENT DOCUMENTS 2,724,707 A    11/1955    Brown (Continued)

FOREIGN PATENT DOCUMENTS

EP    0 199 064 B1    10/1986

(Continued)

OTHER PUBLICATIONS

R. Alex et al., "Effect of Fillers and Moulding Conditions on Properties of Self-Vulcanisable Blends of Epoxidised Natural Rubber and Carboxylated Nitrile Rubber", Plastics and Rubber Processing and Applications, vol. 15, pp. 223-234, (1991).

(Continued)

*Primary Examiner*—Justin Fischer
(74) *Attorney, Agent, or Firm*—Finnegan, Henderson, Farabow, Garrett & Dunner, L.L.P.

(57) ABSTRACT

A crosslinkable elastomeric composition includes at least one elastomeric polymer including carboxylic groups, and at least one epoxidized elastomeric polymer including greater than or equal to 0.1 mol % and less than or equal to 20 mol % of epoxide groups relative to a total number of moles of monomers present in the at least one epoxidized elastomeric polymer. The composition is crosslinkable in a substantial absence of additional crosslinking agents. A tire for vehicles includes a carcass structure, a belt structure extended coaxially around the carcass structure, and a tread band extended coaxially around the belt structure. The tread band comprises an external rolling surface intended to come into contact with the ground. In one embodiment of the present invention, the tread band includes at least one crosslinked elastomeric material. A process for producing the tire is also disclosed.

44 Claims, 1 Drawing Sheet

U.S. PATENT DOCUMENTS

| | | | |
|---|---|---|---|
| 2,947,338 A | * | 8/1960 | Reid et al. ............... 152/209.1 |
| 3,846,365 A | | 11/1974 | Berg et al. |
| 4,341,672 A | | 7/1982 | Hsieh et al. |
| 4,768,937 A | | 9/1988 | Singh |
| 4,872,822 A | | 10/1989 | Pizzorno |
| 5,173,557 A | | 12/1992 | Parker et al. |
| 5,462,979 A | * | 10/1995 | Sandstrom ................. 523/438 |
| 5,489,628 A | * | 2/1996 | Sandstrom ................. 523/213 |

FOREIGN PATENT DOCUMENTS

| | | |
|---|---|---|
| EP | 0 242 840 B1 | 10/1987 |
| EP | 0 928 680 A1 | 7/1999 |
| EP | 0 928 702 A1 | 7/1999 |
| EP | 1 231 079 A1 | 8/2002 |
| IT | 1245551 | 9/1994 |
| WO | WO00/37555 | 6/2000 |

OTHER PUBLICATIONS

S.K. Chakraborty et al., "Epoxy-Resin-Cured Carboxylated Nitrile Rubber", Journal of Applied Polymer Science, vol. 27, pp. 4561-4576, (1982).

H.P. Brown, "Carboxylic Elastomers", Rubber Chemistry and Technology, vol. XXX, No. 5, pp. 1347-1386, (1957).

D.N. Schulz et al., "Recent Advances in the Chemical Modification of Unsaturated Polymers", Rubber Chemistry and Technology, vol. 55, pp. 809-859, (1982).

* cited by examiner

US 7,144,465 B2

CROSSLINKABLE ELASTOMERIC COMPOSITION, TIRE INCLUDING A CROSSLINKED ELASTOMERIC MATERIAL, AND PROCESS FOR PRODUCING THE TIRE

CROSS-REFERENCE TO RELATED APPLICATIONS

This application is a national-phase entry under 35 U.S.C. § 371 from International Application No. PCT/EP02/01693, filed Feb. 18, 2002, in the European Patent Office, the contents of which are relied upon and incorporated herein by reference; additionally, Applicants claim the right of priority under 35 U.S.C. § 119(a)–(d) based on patent application No. 01104646.3, filed Feb. 23, 2001, in the European Patent Office; further, Applicants claim the benefit under 35 U.S.C. § 119(e) based on provisional application No. 60/272,308, filed Mar. 2, 2001, in the U.S. Patent and Trademark Office.

BACKGROUND OF THE TNVENTION

1. Field of the Invention

The present invention relates to a process for producing tyres for vehicle wheels, to the tyres thus obtained and to the crosslinkable elastomeric compositions used therein. More particularly, the present invention relates to a process for producing tyres for vehicle wheels, which can be carried out in the substantial absence of conventional crosslinking agents, to the tyres thus obtained and to the crosslinkable compositions used therein.

2. Description of the Related Art

Processes for vulcanizing diene elastomers with sulphur are widely used in the rubber industry for the production of a wide range of products, and in particular tyres for vehicle wheels. Although these processes give high-quality vulcanized products, they are considerably complicated to carry out, mainly due to the fact that, in order to obtain optimum vulcanization within industrially acceptable times, it is necessary to use a complex vulcanizing system which includes, besides sulphur or sulphur-donating compounds, one or more activators (for example stearic acid, zinc oxide and the like) and one or more accelerators (for example thiazoles, dithiocarbamates, thiurams, guanidines, sulphenamides and the like). The presence of these products can, in some cases, entail considerable problems in terms of the harmfulness/toxicity both during production and during use, in particular when the vulcanized products are intended for medical/health-care or food use. In addition, it is known that the use of sulphur or sulphur-donating compounds leads, during the vulcanization stage which is generally carried out at temperatures above 150° C., to the development of volatile sulphurized compounds.

Consequently, in recent years, research efforts have been directed along two different lines, the first being to improve the known vulcanization processes in order to make them more efficient and cleaner, the second aimed at developing alternative crosslinking techniques. Although appreciable progress has been made, it is not possible to state at the present time that alternative techniques to crosslinking with sulphur exist which would give similar results and would simultaneously afford an effective simplification in terms of production. For example, crosslinking processes via peroxide compounds require special precautions on account of the instability of these compounds, in addition to requiring the use of activators. Crosslinking by means of radiation involves the use of complex equipment, as well as the incorporation of all the precautions required when high-energy and high-power radiation is used.

So-called "self-crosslinking" elastomeric compositions, i.e. compositions which do not require the use of crosslinking agents such as sulphur or sulphur compounds, are known in the art.

For example, U.S. Pat. No. 2,724,707 describes elastomeric compositions consisting of a diene polymer containing carboxylic groups, in particular a carboxylated nitrile rubber (XNBR) obtained by partial hydrolysis of a butadiene/acrylonitrile polymer, in which a polyvalent metal oxide (for example zinc oxide) is dispersed. On heating these compositions, they crosslink according to a mechanism of ionic type.

A study of the crosslinking of XNBR with a high degree of carboxylation, by reaction with an epoxy resin (for example bisphenol A diglycidyl ether) in the presence of reinforcing fillers such as carbon black, silica and clay, is reported in the article by S. K. Chakraborty and S. K. De, published in the *Journal of Applied Polymer Science*, Vol. 27, pp. 4561–4576 (1982). The crosslinking is carried out by heating the compound to 150°–180° C. As is known, epoxy resins are low molecular weight products in which the epoxide (or oxirane) groups are "external", i.e. they are located in a terminal position on the main hydrocarbon chain, the oxygen atom forming the oxirane ring being linked to both the last and the penultimate carbon atoms of this chain.

A study of the crosslinking of a composition based on epoxidized natural rubber (ENR) and XNBR is reported in the article by R. Alex, P. P. De, N. M. Mathew and S. K. De, published in *Plastics and Rubber Processing and Applications*, Vol. 14, No. 4, 1990. In particular, this article describes the crosslinking of compositions consisting of ENR and XNBR as such or containing silica or carbon black as reinforcing filler. According to what reported by the authors, the crosslinking reaction in the ENR and XNBR mixtures comprises the formation of ester bonds between the epoxide groups and carboxylic groups. The rheometric curves would show absence of reversion, stability of the crosslinked structure and a high rate of crosslinking.

Italian patent IT 1,245,551 describes self-crosslinking compositions containing an epoxidized elastomer and a crosslinking agent of formula R1-R—R2, in which R is an arylene, alkylene or alkenylene group, while R1 and R2 are carboxylic, amine, sulphonic or chlorosulphonic groups. Dicarboxylic or polycarboxylic acids, or mixtures thereof, can be used as crosslinking agents. Self-crosslinking compositions containing an epoxidized elastomer and a second elastomer in which the repeating units of the polymer chain contain at least one carboxylic group are also described. For example, self-crosslinking compositions are obtained by mixing an epoxidized elastomer (for example the products ENR 25 or ENR 50 which are available under the brand name Epoxyprene® from Guthrie Symington Ltd.) with a butadiene/acrylic acid copolymer (for example a product sold by Polysar/Bayer under the brand name Krynac®). The crosslinking reaction takes place by heating between the epoxide groups and the carboxylic groups, with formation of ester bonds.

U.S. Pat. No. 5,173,557 describes self-vulcanizing compositions comprising an elastomeric polymer functionalized with isocyanate groups and a compound containing at least two active hydrogens of Zerewitinoff type, or self-crosslinking compositions comprising an elastomeric polymer containing active hydrogens of Zerewitinoff type and a compound containing at least two isocyanate groups.

Alternatively, an elastomeric polymer containing either isocyanate groups or active hydrogens of Zerewitinoff type can be used, without using an additional crosslinking agent. The active hydrogens can be present, for example, on hydroxide, amine, carboxylic or thiol groups. In order to avoid undesired pre-crosslinking of the elastomer, the isocyanate groups are blocked beforehand with suitable functional groups, which are removed by heating before the crosslinking reaction between the free isocyanate groups and the active hydrogens, optionally with the aid of a catalyst.

On the basis of the Applicant's experience, the self-crosslinking compositions proposed hitherto in the prior art do not provide a valid alternative to conventional compositions vulcanized with sulphur or derivatives thereof. The reason for this is that the performance qualities of the crosslinked products are generally unsatisfactory, in particular for applications such as tyre compounds, in which a substantial consistency of the elastic performance qualities over a wide range of working temperatures and at the same time high abrasion resistance without unacceptably increasing the hardness is required. This is the case, for example, for the self-crosslinking compositions described above in which a polymer containing carboxylic groups (for example XNBR) is hot-crosslinked in admixture with an epoxidized elastomeric polymer or with an epoxy resin.

SUMMARY OF THE INVENTION

The Applicant has now found that crosslinked products, and in particular tyres for vehicle wheels, which have the desired combination of properties can be produced in the substantial absence of additional crosslinking agents, by using self-crosslinking compositions comprising a mixture of an elastomeric polymer containing carboxylic groups and an epoxidized elastomeric polymer containing from 0.1 mol % to 20 mol % of epoxide groups relative to the total number of moles of monomers present in the polymer.

After heating, these compositions achieve a high degree of crosslinking without addition of conventional crosslinking agents, with crosslinking times contained within limits which are acceptable for industrial use. The resulting crosslinked product combines excellent mechanical and elastic performance qualities (in particular stress at break, elongation at break, modulus and hardness) which are such as to make the self-crosslinking compositions above particularly suitable as elastomeric materials to be used for the production of tyres, in particular tread bands.

According to a first aspect, the present invention thus relates to a process for producing tyres for vehicle wheels, said process comprising the following stages:

manufacturing a green tyre comprising at least one crosslinkable elastomeric material;

subjecting the green tyre to moulding in a mould cavity defined in a vulcanization mould;

crosslinking the elastomeric material by heating the tyre to a predetermined temperature and for a predetermined time;

characterized in that the crosslinkable elastomeric material comprises: (a) an elastomeric polymer containing carboxylic groups, (b) an epoxidized elastomeric polymer containing from 0.1 mol % to 20 mol % of epoxide groups relative to the total number of moles of monomers present in the polymer, in which said crosslinking stage is carried out in the substantial absence of additional crosslinking agents.

According to a preferred aspect, the crosslinkable elastomeric material may comprise a lubricant, preferably an epoxidized lubricant containing epoxide groups located internally on the molecule.

According to another preferred aspect, the crosslinking stage is carried out by heating the crosslinkable elastomeric material to a temperature of at least 120° C. for a time of at least 3 minutes, preferably to a temperature of from 130° C. to 230° C. for a time of from 5 to 90 minutes.

In accordance with a particularly preferred aspect, said crosslinkable elastomeric material also comprises a reinforcing filler.

In a second aspect, the present invention relates to a tyre for vehicles wheels, comprising one or more components made of crosslinked elastomeric material, characterized in that at least one of said components comprises, as crosslinked elastomeric material, an elastomeric polymer containing carboxylic groups and an epoxidized elastomeric polymer containing from 0.1 mol % to 20 mol % of epoxide groups relative to the total number of moles of monomers present in the polymer, said polymers being crosslinked in the substantial absence of additional crosslinking agents.

According to a preferred aspect, the crosslinkable elastomeric material may comprise a lubricant, preferably an epoxidized lubricant containing epoxide groups located internally on the molecule.

According to a further aspect, the present invention relates to a tyre for vehicles, comprising a belt structure extended coaxially around a carcass structure and a tread band extended coaxially around the belt structure and having an external rolling surface which is intended to come into contact with the ground, characterized in that said tread band comprises an elastomeric polymer containing carboxylic groups and an epoxidized elastomeric polymer containing from 0.1 mol % to 20 mol % of epoxide groups relative to the total number of moles of monomers present in the polymer, said polymers being crosslinked in the substantial absence of additional crosslinking agents.

According to a preferred aspect, the crosslinkable elastomeric material may comprise a lubricant, preferably an epoxidized lubricant containing epoxide groups located internally on the molecule.

According to a further aspect, the present invention relates to a crosslinkable elastomeric composition comprising: (a) an elastomeric polymer containing carboxylic groups; and (b) an epoxidized elastomeric polymer containing from 0.1 mol % to 20 mol % of epoxide groups relative to the total number of moles of monomers present in the polymer; said composition being crosslinkable in the substantial absence of additional crosslinking agents.

According to a preferred aspect, said composition may comprise a lubricant, preferably an epoxidized lubricant containing epoxide groups located internally on the molecule.

According to a further aspect, the present invention relates to a crosslinked elastomeric product obtained by crosslinking a crosslinkable composition as defined above.

For the purposes of the present description and the claims, the expression "in the substantial absence of additional crosslinking agents" means that the crosslinkable composition is not subjected to the action of other systems capable of bringing about its crosslinking, or that other products which may be present in the composition can in themselves participate in the crosslinking reaction, but are used in amounts less than the minimum amount required to obtain an appreciable degree of crosslinking in short times (for example within 5 minutes). In particular, the compositions according to the present invention are crosslinkable in the substantial absence of the crosslinking systems commonly used in the art, such as, for example, sulphur or sulphur donors, peroxides or other radical initiators, and neither are these compositions subjected to the action of high-energy radiation (UV, gamma rays, etc.) such as to induce crosslinking phenomena in the polymer The elastomeric polymers containing carboxylic or epoxide groups (which are also referred to hereinbelow for simplicity as "carboxylated elastomeric polymers" and "epoxidized elastomeric polymers") which may be used in accordance with the present invention are homopolymers or copolymers with elastomeric properties, having a glass transition temperature ($T_g$) of less than 23° C. and preferably less than 0° C. The carboxylated elastomeric polymers may generally contain at least 0.1 mol %, preferably from 1 mol % to 30 mol %, more preferably from 2 mol % to 20 mol %, of carboxylic groups relative to the total number of moles of monomers present in the polymer. The epoxidized elastomeric polymers generally contain from 0.1 mol % to 20 mol %, preferably from 0.5 mol % to 15 mol %, more preferably from 1 mol % to 10 mol %, of epoxide groups relative to the total number of moles of monomers present in the polymer. Blends of various polymers containing carboxylic or epoxide groups, or alternatively blends of one or more carboxylated or epoxidized polymers with one or more non-functionalized elastomeric polymers, also fall within the present definition.

Both for the carboxylated copolymers and for the epoxidized copolymers, the structure can have a random, blocked, grafted or mixed structure. The average molecular weight of the polymer is preferably between 2,000 and 1,000,000, preferably between 50,000 and 500,000.

Epoxidized or carboxylated diene homopolymers or copolymers in which the base polymer structure, of synthetic or natural origin, is derived from one or more conjugated diene monomers, optionally copolymerized with monovinylarenes and/or polar comonomers, are particularly preferred. Preferably, the base polymer structure is derived from the (co)polymerization of diene monomers containing from 4 to 12, preferably from 4 to 8, carbon atoms, chosen, for example, from: 1,3-butadiene, isoprene, 2,3-dimethyl-1,3-butadiene, 3-butyl-1,3-octadiene, 2-phenyl-1,3-butadiene, and the like, or mixtures thereof. 1,3-Butadiene and isoprene are particularly preferred.

Monovinylarenes which can optionally be used as comonomers generally contain from 8 to 20, preferably from 8 to 12, carbon atoms and can be chosen, for example, from: styrene; 1-vinyl-naphthalene; 2-vinyl-naphthalene; various alkyl, cycloalkyl, aryl, alkylaryl or arylalkyl derivatives of styrene, such as, for example: 3-methylstyrene, 4-propylstyrene, 4-cyclo-hexylstyrene, 4-dodecylstyrene, 2-ethyl-4-benzylstyrene, 4-p-tolylstyrene, 4-(4-phenylbutyl) styrene, and the like, or mixtures thereof. Styrene is particularly preferred. These monovinylarenes can optionally be substituted with one or more functional groups, such as alkoxy groups, for example 4-methoxystyrene, amino groups, for example 4-dimethylaminostyrene, and the like.

Various polar comonomers can be introduced into the base polymer structure, in particular vinylpyridine, vinylquinoline, acrylic and alkylacrylic acid esters, nitriles and the like, or mixtures thereof, such as, for example: methyl acrylate, ethyl acrylate, methyl methacrylate, ethyl methacrylate, acrylonitrile.

Among the base polymer structures which are particularly preferred are: natural rubber, polybutadiene, polyisoprene, styrene/butadiene copolymers, butadiene/isoprene copolymers, styrene/isoprene copolymers, butadiene/acrylonitrile copolymers, nitrile rubbers, or mixtures thereof.

In the case of base structures of copolymer type, the amount of diene comonomer relative to the other comonomers is such as to ensure that the final polymer has elastomeric properties. In this sense, it is not possible generally to establish the minimum amount of diene comonomer required to obtain the desired elastomeric properties. As an indication, an amount of diene comonomer of at least 50% by weight relative to the total weight of the comonomers can generally be considered sufficient.

The preparation of the base polymer can be carried out according to known techniques, generally by (co)polymerization of the corresponding monomers in emulsion, in suspension or in solution.

To introduce carboxylic groups, to obtain carboxylated elastomeric polymers, the base polymer thus obtained can be made to react with a carboxylating agent in the presence of a radical initiator, preferably an organic peroxide (for example dicumyl peroxide or benzoyl peroxide). Carboxylating agents commonly used are, for example: maleic anhydride, itaconic anhydride, thioglycolic acid, beta-mercaptopropionic acid, and the like.

Further information regarding the structure and the processes for producing carboxylated elastomers are given, for example, in the article by H. P. Brown in *Rubber Chemistry and Technology*, Vol. XXX, 5, page 1347 et seq (1957) or in U.S. Pat. No. 2,724,707.

The epoxidation to obtain epoxidized elastomeric polymers is carried out according to known techniques, for example by reaction in solution with an epoxidizing agent. This agent is generally a peroxide or a peracid, for example m-chloroperbenzoic acid or peracetic acid, and the like, or hydrogen peroxide in the presence of a carboxylic acid or a derivative thereof, for example acetic acid or acetic anhydride and the like, optionally mixed with an acid catalyst such as sulphuric acid. More details regarding processes for epoxidizing elastomeric polymers are disclosed, for example, in U.S. Pat. No. 4,341,672 or by Schulz et al. in *Rubber Chemistry and Technology*, Vol. 55, p. 809 et seq.

The introduction of carboxylic or epoxide groups can also be carried out during the synthesis of the polymer by copolymerization of a conjugated diene, optionally mixed with monovinylarenes and/or polar comonomers, as reported above, and an olefinic comonomer containing, respectively, one or more carboxylic or epoxide groups, or derivatives thereof.

Carboxylated olefinic comonomers that are usually used are, for example: acrylic acid, methacrylic acid, sorbic acid, beta-acryloxypropanoic acid, ethacrylic acid, 2-ethyl-3-propylacrylic acid, vinylacrylic acid, itaconic acid, cinnamic acid, maleic acid, fumaric acid, and the like, or mixtures thereof.

Within this class of carboxylated elastomeric polymers, particularly preferred are: 1,3-butadiene/(meth)acrylic acid copolymers, 1,3-butadiene/acrylonitrile/(meth)acrylic acid copolymers, 1,3-butadiene/styrene/(meth)acrylic acid copolymers, and the like, or mixtures thereof.

Alternatively, in the case of carboxylated polymers the corresponding carboxylic derivatives may be used, in particular anhydrides, esters, nitriles or amides. In the latter case, the polymer obtained is then subjected to hydrolysis so as to partially or totally convert the functional groups thus introduced into free carboxylic groups.

Olefinic comonomers containing epoxide groups may be chosen, for example, from: glycidyl acrylate, glycidyl methacrylate, vinylcyclohexene monoxide, allyl glycidyl ether and methallyl glycidyl ether. The introduction of the epoxide groups via the abovementioned epoxidized comonomers may be carried out by copolymerization of the corresponding monomers according to known techniques, in particular by radical-mediated emulsion copolymerization.

Other carboxylated or epoxidized elastomeric polymers which may be used are elastomeric copolymers of one or more monoolefins with an olefinic comonomer containing one or more carboxylic or epoxide groups or derivatives thereof. The monoolefins can be chosen from: ethylene and alfa-olefins generally containing from 3 to 12 carbon atoms, such as, for example: propylene, 1-butene, 1-pentene, 1-hexene, 1-octene and the like, or mixtures thereof. The following are preferred: copolymers of ethylene and an alfa-olefin, and optionally a diene; homopolymers of isobutene or copolymers thereof with small amounts of a diene, which are optionally at least partially halogenated. The diene optionally present contains, in general, from 4 to 20 carbon atoms, and is preferably chosen from: 1,3-butadiene, isoprene, 1,4-hexadiene, 1,4-cyclohexadiene, 5-ethylidene-2-norbornene, 5-methylene-2-norbornene, and the like. Among these, the following are particularly preferred: ethylene/propylene copolymers (EPR) or ethylene/propylene/diene copolymers (EPDM); polyisobutene; butyl rubbers; halobutyl rubbers, in particular chlorobutyl or bromobutyl rubbers; and the like, or mixtures thereof.

Olefinic comonomers containing epoxide or carboxyl groups may be chosen from those mentioned above for the diene polymers.

When a diene comonomer is present, it may be used to introduce carboxylic or epoxide groups by means of a carboxylation or epoxidation reaction, respectively, as described above.

In accordance with the present invention, the carboxylated elastomeric polymer is generally present in amounts of from 10 to 90 phr (phr=parts by weight per 100 parts of polymer base), preferably from 25 to 85 phr, and the epoxidized elastomeric polymer is generally present in an amount of from 10 to 90 phr, preferably from 15 to 75 phr.

The crosslinkable compositions according to the present invention can contain reinforcing fillers, in amounts generally of between 10 and 120 phr, preferably from 30 to 100 phr. The reinforcing filler may be chosen from those commonly used for crosslinked products, and in particular for tyres, such as: carbon black, silica, alumina, aluminosilicates, calcium carbonate, kaolin, and the like, or mixtures thereof.

The crosslinkable compositions according to the present invention can comprise other commonly used additives chosen on the basis of the specific application for which they are intended. For example, the following can be added to these compositions: antioxidants, protective agents, plasticizers, compatibilizing agents for the reinforcing filler, adhesives, anti-ozone agents, modifying resins, fibres (for example Kevlar® pulp), and the like.

In particular, for the purpose of further improving the processability, a lubricant can be added to the crosslinkable compositions according to the present invention, this lubricant being chosen in general from mineral oils, vegetable oils, synthetic oils and the like, or mixtures thereof, for example: aromatic oil, naphthenic oil, soybean oil, and the like. Polar lubricants, for example phthalates and polyesters, are particularly preferred.

Epoxidized lubricants may also be used, in particular lubricants containing epoxide groups located internally on the molecule (which are referred to for simplicity hereinbelow as "organic compounds with internal epoxide groups" or "epoxidized organic compounds"). These are products of hydrocarbon type which are in the form of oils or viscous liquids at room temperature.

Said lubricants contain at least two internal epoxide groups, i.e. groups in which an oxirane bridge links:
(i) two adjacent carbon atoms located on the main chain, with the condition that neither of said two adjacent carbon atoms is a terminal carbon atom of the chain; or
(ii) two adjacent carbon atoms located on a side chain.

However, the presence of internal epoxide groups does not exclude the possibility of the molecule also having epoxide groups in a terminal position.

At least two internal epoxide groups are present in the preferred lubricants according to the present invention. In general, the amount of epoxide groups is such that the epoxide equivalent weight of the epoxidized compound is usually between 40 and 2,000, preferably between 50 and 1,500, more preferably between 100 and 1,000. The term "epoxide equivalent weight" (EEW) means the molecular weight of the epoxidized compound per mole of oxirane oxygen, or:

$$EEW = \frac{1600}{\%O}$$

where % O is the content of oxirane oxygen, expressed as a percentage by weight of oxirane oxygen relative to the total weight of the compound. The content of oxirane oxygen in the epoxidized compounds can be determined according to known techniques, for example by titration with a solution of hydrobromic acid in acetic acid.

One class of polar lubricants containing internal epoxide groups which are particularly preferred is that of epoxidized oils, which can be obtained by epoxidation of unsaturated fatty acids or esters (in particular glycerides, diglycerides or triglycerides) of unsaturated fatty acids, of synthetic or natural origin, or alternatively by epoxidation of mixtures of said unsaturated acids or esters with saturated fatty acids or esters thereof. The saturated or unsaturated fatty acids generally contain from 10 to 26 carbon atoms, preferably from 14 to 22 carbon atoms. Examples of unsaturated fatty acids are: myristoleic acid, palmitoleic acid, oleic acid, gadoleic acid, erucic acid, ricinoleic acid, linoleic acid, linolenic acid, arachidonic acid, and the like, or mixtures thereof. Examples of saturated fatty acids are: lauric acid, myristic acid, palmitic acid, stearic acid, behenic acid, and the like, or mixtures thereof. Epoxidized vegetable oils such as, for example: epoxidized linseed oil, epoxidized safflower oil, epoxidized soybean oil, epoxidized corn oil, epoxidized cottonseed oil, epoxidized rapeseed oil, epoxidized castor oil, epoxidized tung oil, epoxidized tall oil, octyl epoxytallate, epoxidized sunflower oil, epoxidized olive oil, and the like, or mixtures thereof, are particularly preferred. The epoxidized oils generally have a freezing temperature of less than 23° C., preferably less than 10° C. Products of this type can be found on the market, for example, under the brand names Epoxol® (FACI, American Chemical Service Inc.); Paraplex®, Plasthall® and Monoplex® (C. P. Hall); Vikoflex® and Ecepox® (Elf Atochem).

Another class of lubricants containing internal epoxide groups which can be used advantageously according to the present invention consists of epoxidized diene oligomers, in which the base polymer structure, of synthetic or natural origin, is derived from one or more conjugated diene monomers, optionally copolymerized with other monomers containing ethylenic unsaturation. These oligomers generally have an average molecular weight (number-average), which can be determined, for example, by gel permeation chromatography (GPC), of between 500 and 10,000, preferably between 1,000 and 8,000.

Oligomers derived from the (co)polymerization of conjugated diene monomers containing from 4 to 12, preferably from 4 to 8, carbon atoms, chosen, for example, from: 1,3-butadiene, isoprene, chloroprene, 2,3-dimethyl-1,3-butadiene, 3-butyl-1,3-octadiene, 2-phenyl-1,3-butadiene, and the like, or mixtures thereof, are particularly preferred. 1,3-Butadiene and isoprene are particularly preferred.

The diene monomers can optionally be copolymerized with other monomers containing ethylenic unsaturation, such as, for example: alfa-olefins containing from 2 to 12 carbon atoms (for example ethylene, propylene or 1-butene), monovinylarenes containing from 8 to 20 carbon atoms (for example styrene, 1-vinylnaphthalene or 3-methylstyrene), vinyl esters in which the ester group contains from 2 to 8 carbon atoms (for example vinyl acetate, vinyl propionate or vinyl butanoate), alkyl acrylates and alkyl methacrylates in which the alkyl contains from 1 to 8 carbon atoms (for example ethyl acrylate, methyl acrylate, methyl methacrylate, tert-butyl acrylate or n-butyl acrylate), acrylonitrile, and the like, or mixtures thereof.

Among the epoxidized diene oligomers which are preferred are those derived from the epoxidation of oligomers of: 1,3-butadiene; isoprene; 1,3-butadiene and styrene; 1,3-butadiene and isoprene; isoprene and styrene; 1,3-butadiene and acrylonitrile; and the like. Epoxidized oligomers of 1,3-butadiene or of isoprene are particularly preferred.

Epoxidized diene oligomers which may be used in the present invention are commercially available, for example under the brand name Poly BD® from Elf Atochem. The amount of lubricant may generally range from 5 to 70 phr and preferably from 10 to 50 phr.

For the purpose of increasing the rate of crosslinking, an effective amount of a condensation catalyst may also be added to the crosslinkable compositions according to the present invention. This amount may vary within a wide range, and is generally from 0.01 to 5 parts by weight, preferably from 0.1 to 3 parts by weight, relative to 100 parts by weight of carboxylated elastomeric polymer. The catalyst may be chosen from:

carboxylates of metals such as tin, zinc, zirconium, iron, lead, cobalt, barium, calcium or manganese, and the like, for example: dibutyltin dilaurate, dibutyltin diacetate, dioctyltin dilaurate, stannous acetate, stannous caprylate, lead naphthenate, zinc caprylate, zinc naphthenate, cobalt naphthenate, ferrous octanoate, iron 2-ethylhexanoate, and the like;

arylsulphonic acids or derivatives thereof, for example: p-dodecylbenzenesulphonic acid, tetrapropylbenzenesulphonic acid, acetyl p-dodecylbenzenesulphonate, 1-naphthalenesulphonic acid, 2-naphthalenesulphonic acid, acetyl methanesulphonate, acetyl p-toluenesulphonate, and the like;

strong inorganic acids or bases, such as sodium hydroxide, potassium hydroxide, hydrochloric acid or sulphuric acid, and the like;

amines and alkanolamines, for example ethylamine, dibutylamine, hexylamine, pyridine or dimethylethanolamine, and the like;

oxides or inorganic salts of a metal chosen from Fe, Cu, Sn, Mo and Ni (as disclosed in the co-pendent European patent application No. 01-102 664 in the name of the Applicant, which is incorporated herein by reference), or mixtures thereof.

When an inorganic salt is used, this salt is preferably chosen from chlorides, bromides, sulphates, nitrates, in anhydrous or hydrated form.

For example, the crosslinking accelerator may be chosen from $SnCl_2.2H_2O$, $CuSO_4.5H_2O$, $(NH_4)_2Fe(SO_4)_2.6H_2O$, $NiNO_3.6H_2O$ and $MoO_3$, or mixtures thereof (as disclosed in the abovementioned European patent application No. 01-102 664).

The crosslinkable compositions according to the present invention can be prepared by mixing the polymer base and the reinforcing filler optionally present and the other additives according to techniques known in the art. The mixing can be carried out, for example, using an open-mill mixer, or an internal mixer of the type with tangential rotors (Banbury) or interlocking rotors (Intermix), or in continuous mixers of the Ko-neader (Buss) or co-rotating or counter-rotating twin-screw type.

During the mixing, the temperature is kept below a predetermined value so as to avoid premature crosslinking of the composition. To this end, the temperature is generally kept below 170° C., preferably below 150° C., even more preferably below 140° C. As regards the mixing time, this can vary within a wide range, depending mainly on the specific composition of the mixture, on the presence of any fillers and on the type of mixer used. In general, a mixing time of more than 90 sec, preferably between 3 and 35 min, is sufficient to obtain a homogeneous composition.

In order to optimize the dispersion of the filler while keeping the temperature below the values indicated above, multi-stage mixing processes can also be employed, optionally using a combination of different mixers arranged in series.

As an alternative to the abovementioned solid-state mixing processes, in order to improve the dispersion of the components, the crosslinkable compositions according to the present invention can advantageously be prepared by mixing the reinforcing filler and the other additives, with the polymer base in the form of an aqueous emulsion or a solution in an organic solvent. The filler, if present, can be used as it is or in the form of a suspension or dispersion in an aqueous medium. The polymer is subsequently separated from the solvent or from the water by suitable means. For example, when a polymer in emulsion is used, the polymer can be precipitated in the form of particles containing the oily phase and the filler, if present, can be obtained by adding a coagulant. A coagulant which can be used in particular is an electrolytic solution, for example an aqueous sodium or potassium silicate solution. The coagulation process can be promoted by using a volatile organic solvent which is then removed by evaporation during precipitation of the filled polymer. Further details regarding processes of this type for the preparation of elastomeric compounds are given, for example, in U.S. Pat. No. 3,846,365.

BRIEF DESCRIPTION OF THE DRAWINGS

The present invention will now be illustrated in further detail by means of a number of preparation examples, with reference to:

the attached FIG. 1, which is a view in cross section with partial cutaway of a tyre according to the present invention.

DETAILED DESCRIPTION OF THE EMBODIMENTS

Figure 1:
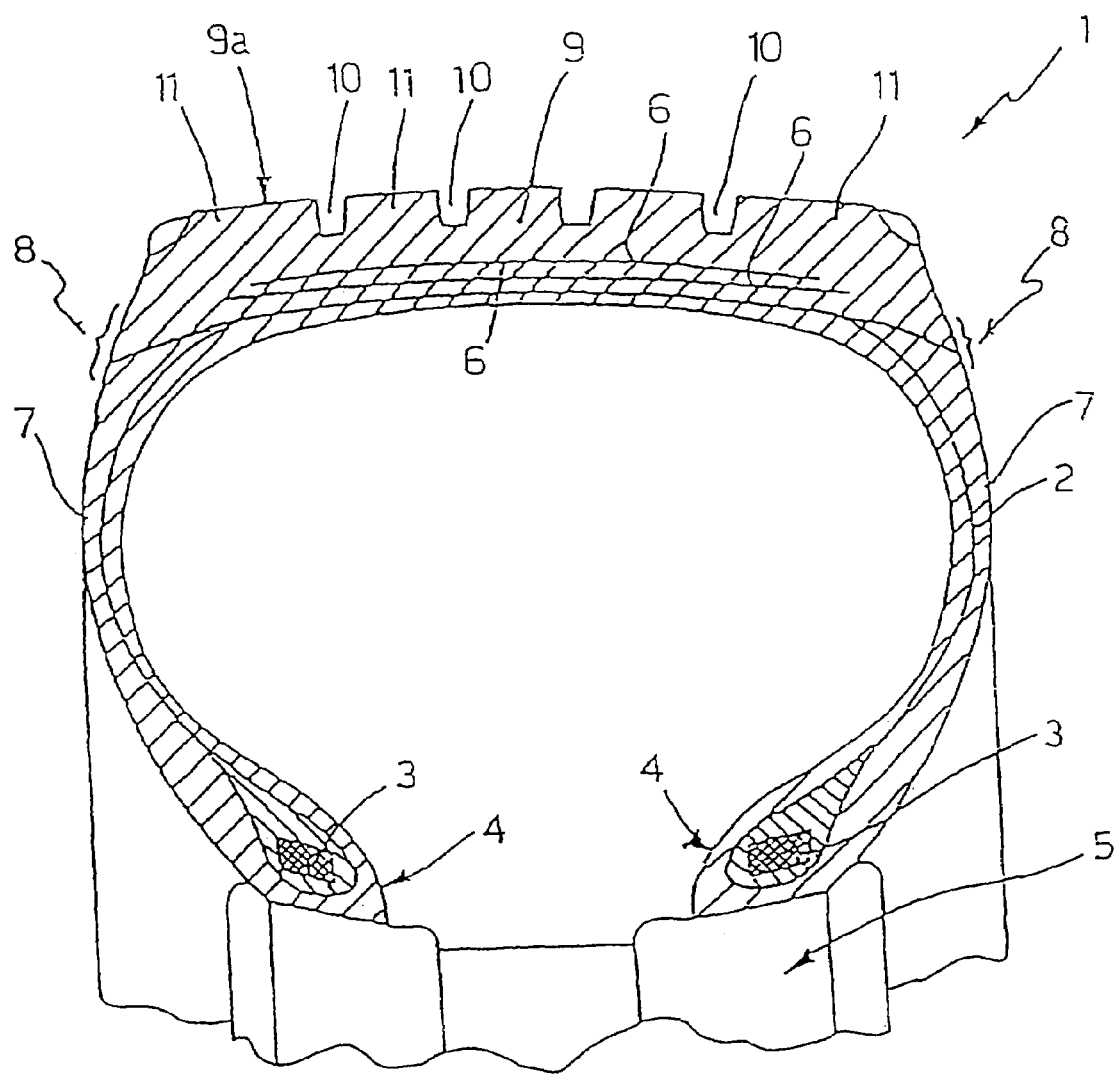

With reference to FIG. 1, a tyre 1 conventionally comprises at least one carcass ply 2 whose opposite lateral edges are associated with respective anchoring bead wires 3, each enclosed in a bead 4 defined along an inner circumferential edge of the tyre, with which the tyre engages on a rim 5 forming part of the wheel of a vehicle.

The association of the carcass ply 2 to the bead wires 3 is usually carried out by folding back the opposite side edges of the carcass ply 2 around the bead wires 3, so as to form what is known as carcass back-folds.

Alternatively, conventional bead wires 3 may be replaced with a pair of circumferentially inextensible annular inserts formed from elongate elements arranged in concentric coils (not shown in FIG. 1) (see, for example, European patent applications EP-A-0 928 680 and EP-A-0 928 702). In this case, the carcass ply 2 is not back-folded around said annular inserts, the coupling being provided by a second carcass ply (not shown in FIG. 1) applied externally to the first carcass ply.

Along the circumferential development of the carcass ply 2 are applied one or more belt strips 6, made using metal or textile cords enclosed in a sheet of compound. Outside the carcass ply 2, in respective opposite side portions of this ply, there is also applied a pair of side walls 7, each of which extends from the bead 4 to a so-called "shoulder" region 8 of the tyre, defined by the opposing ends of the belt strips 6. On the belt strips 6 is circumferentially applied a tread band 9 whose side edges end at the shoulders 8, joining it to the side walls 7. The tread band 9 externally has a rolling surface 9a, designed to come into contact with the ground, in which circumferential grooves 10 can be provided, intercalated with transverse notches, not shown in the attached figure, which define a plurality of blocks 11 variously distributed on said rolling surface 9a.

The process for producing the tyre according to the present invention can be carried out according to techniques and using apparatus known in the art (see, for example, patents EP 199,064, U.S. Pat. No. 4,872,822 and U.S. Pat. No. 4,768,937). More particularly, this process comprises a stage of manufacturing the green tyre, in which a series of semi-finished articles, prepared beforehand and separately from each other and corresponding to the various parts of the tyre (carcass plies, belt strips, bead wires, fillers, side walls and tread bands) are combined together using a suitable manufacturing machine.

The green tyre thus obtained is then subjected to the subsequent stages of moulding and crosslinking. To this end, a vulcanization mould is used which is designed to receive the tyre being processed inside a moulding cavity having walls which are countermoulded to the outer surface of the tyre when the crosslinking is complete. Alternative processes for producing a tyre or tyre parts without using semi-finished products are disclosed, for example, in the abovementioned patent applications EP-A-0 928 680 and EP-A-0 928 702.

The green tyre can be moulded by introducing a pressurized fluid into the space defined by the inner surface of the tyre, so as to press the outer surface of the green tyre against the walls of the moulding cavity. In one of the moulding methods most widely practised, a vulcanization chamber made of elastomeric material, filled with steam and/or another fluid under pressure, is inflated inside the tyre closed inside the moulding cavity. In this way, the green tyre is pushed against the inner walls of the moulding cavity, thus obtaining the desired moulding. Alternatively, the moulding can be carried out without an inflatable vulcanization chamber, by providing inside the tyre a toroidal metal support shaped according to the configuration of the inner surface of the tyre to be obtained (see, for example, patent EP 242, 840). The difference in coefficient of thermal expansion between the toroidal metal support and the crude elastomeric material is exploited to achieve an adequate moulding pressure.

At this point, the stage of crosslinking of the crude elastomeric material present in the tyre is carried out. To this end, the outer wall of the vulcanization mould is placed in contact with a heating fluid (generally steam) such that the outer wall reaches a maximum temperature generally of between 100° C. and 230° C. Simultaneously, the inner surface of the tyre is brought to the crosslinking temperature using the same pressurized fluid used to press the tyre against the walls of the moulding cavity, heated to a maximum temperature of between 100 and 250° C. The time required to obtain a satisfactory degree of crosslinking throughout the mass of the elastomeric material can vary in general between 3 min and 90 min and depends mainly on the dimensions of the tyre.

The present invention will now be illustrated in further detail by means of a number of preparation examples.

EXAMPLES 1–6

The epoxidized natural rubber used in the compositions reported in Table 1 was prepared in the following manner.

To a solution of natural rubber dissolved in chloroform (5% by weight of polymer/volume of solvent) were added, with stirring, variable amounts of peracetic acid depending on the desired degree of epoxidation. The solution was brought to a temperature of 40° C. with continued stirring, and left under these conditions for 2 hours. Once the reaction was complete, the polymer was precipitated in methanol. In order to remove any residual epoxidizing agents, all the fractions were redissolved in chloroform and precipitated in methanol. The product obtained was dried in an oven at 20° C. under vacuum.

The degree of epoxidation was determined by NMR analysis.

The compositions reported in Table 1 were prepared using an open cylinder mixer, with a mixing time of about 30 minutes, reaching a final temperature of about 130° C.

The compositions thus prepared were subjected to MDR rheometric analysis using an MDR rheometer from Monsanto, the tests being carried out at 200° C. for 30 minutes, with an oscillation frequency of 1.66 Hz (100 oscillations per minute) and an oscillation amplitude of ±0.5°. Table 1 gives the ML and MH values and the $T_{90}$ value, in which ML is the minimum torque, MH is the maximum torque and $T_{90}$ is the time corresponding to a torque value equal to ML+0.9 (MH-ML). The mechanical properties (according to ISO standard 37) and the hardness in degrees IRHD (according to ISO standard 48) were measured on samples of the abovementioned compositions crosslinked at 200° C. for 15 min. The results are given in Table 1.

TABLE 1

| Example | 1 | 2 | 3 | 4 | 5* | 6* |
|---|---|---|---|---|---|---|
| Nipol EP ® 1072 | 80 | 80 | 80 | 80 | 80 | 80 |
| ENR 2% | 20 | | | | | |
| ENR 4% | | 20 | | | | |

TABLE 1-continued

| Example | 1 | 2 | 3 | 4 | 5* | 6* |
|---|---|---|---|---|---|---|
| ENR 7% | | | 20 | | | |
| ENR 9.5% | | | | 20 | | |
| Epoxyprene ® 25% | | | | | 20 | |
| Epoxyprene ® 50% | | | | | | 20 |
| Zeosil ® 1165 MP | 70 | 70 | 70 | 70 | 70 | 70 |
| PARAPLEX ® G-60 | 30 | 30 | 30 | 30 | 30 | 30 |
| Vulcanox ® 4020 | 1 | 1 | 1 | 1 | 1 | 1 |
| SANTOFLEX ® 13 | 2 | 2 | 2 | 2 | 2 | 2 |
| Poliplastol ® | 3 | 3 | 3 | 3 | 3 | 3 |
| ML 30 min/200° C. | 4.1 | 4.2 | 3.24 | 6.4 | 5.85 | 8.36 |
| MH 30 min/200° C. | 30.3 | 31.5 | 24.5 | 30.1 | 23.1 | 25.9 |
| T90 30 min/200° C. | 4.35 | 4.4 | 3.8 | 4.7 | 5.45 | 5.48 |
| 100% load (MPa) | 3.79 | 4.67 | 4.22 | 4.21 | 6.94 | 10.52 |
| 300% load (MPa) | 9.52 | 11.33 | 10.77 | 10.12 | | |
| Stress at break (MPa) | 10.9 | 12 | 12 | 11.8 | 12.5 | 12.8 |
| Elongation at break | 389 | 354 | 379 | 405 | 208 | 130 |
| IRHD hardness at 23° C. (degrees) | 79 | 78 | 78 | 76 | 80 | 80 |
| IRHD hardness at 100° C. (degrees) | 70 | 72 | 70 | 72 | 76 | 79 |

*comparative
Nipol EP ® 1072: acrylonitrile-butadiene-carboxylate monomer terpolymer containing 28% by weight of acrylonitrile and 7.5% by weight of carboxylic groups (Nippon Zeon);
ENR: epoxidized natural rubber with degrees of epoxidation ranging from 2 mol % to 9.5 mol %, prepared as described above.
Epoxyprene ® ENR 50%: epoxidized natural rubber containing 50 mol % of epoxide groups and having an average molecular weight of greater than 100,000 (produced by Guthrie Symington Ltd).
Epoxyprene ® ENR 25%: epoxidized natural rubber containing 25 mol % of epoxide groups and having an average molecular weight of greater than 100,000 (produced by Guthrie Symington Ltd).
Zeosil ® 1165 MP: precipitated silica with a BET surface area equal to about 165 m$^2$/g (Rhône-Poulenc) Paraplex ® G-60: epoxidized soybean oil having: freezing temperature = 5° C., average molecular weight = 1000 and epoxide-equivalent weight = 210 (C. P. Hall);
Vulcanox ® 4020: tetramethylquinoline (Bayer) Santoflex ® 13: anti-ageing additive 6PPD (Monsanto).
Poliplastol ®: Zn salts of fatty acids (Great Lakes)

EXAMPLES 7–11

The epoxidized polybutadiene (BR) used in the blends indicated in Table 2 was prepared in the following manner.

To a solution of polybutadiene (Europrene® Neocis BR40) dissolved in chloroform (5% by weight of polymer/volume of solvent) was added, with stirring, amounts of peracetic acid varying according to the desired degree of epoxidation. The solution was brought to a temperature of 40° C. with continued stirring, and maintained under these conditions for 2 hours. The epoxidation reaction was carried out in a 5 liter glass reactor equipped with a heating jacket, a sealing stopper and a reflux condenser for the solvent vapours. Once the reaction was complete, the polymer was precipitated in methanol. In order to remove any residual epoxidizing agent, all the fractions were redissolved in chloroform and precipitated in methanol. The product obtained was dried in an oven at 20° C. under vacuum.

The degree of epoxidation was determined by NMR analysis. The compositions given in Table 2 were prepared using an open cylinder mixer, with a mixing time of about 30 minutes, reaching a final temperature of about 130° C.

The compositions were then subjected to MDR rheometric analysis using the same rheometer and under the same conditions as those of Examples 1–6. The optimum crosslinking conditions were determined on the basis of the rheometric analysis.

The mechanical properties (according to ISO standard 37) and the hardness in degrees IRHD at 23° C. and at 100° C. (according to ISO standard 48) were measured on samples of the abovementioned compositions crosslinked under the optimum conditions. The dynamic elastic properties were also evaluated, of which the dynamic elastic modulus (E') measured at 23° C. and at 70° C. by a dynamic Instron device in traction-compression, according to the following methods, are reported. A sample of the crosslinkined material in cylindrical form (length=25 mm; diameter=14 mm), pre-loaded in compression up to a longitudinal deformation of 10% relative to the initial length, and kept at a preset temperature (23° C. or 70° C.) throughout the test, was subjected to a dynamic sinusoidal deformation of amplitude ±3.33% relative to the length under pre-loading, with a frequency of 100 Hz. The results are given in Table 3.

The dynamic elastic properties are expressed in terms of E' and tan delta (loss factor) at 23° C. and at 70° C. As is known, the tan delta value is calculated as the ratio between the viscous modulus (E") and the elastic modulus (E'), both of which are determined by the dynamic measurements mentioned above.

TABLE 2

| Example | 7 | 8 | 9 | 10 | 11 |
|---|---|---|---|---|---|
| Nipol EP ® 1072 | 80 | 80 | 80 | 80 | 80 |
| EBR 3% | 20 | | | | |
| EBR 2.2% | | 20 | | | |
| EBR 6.4% | | | 20 | | |
| EBR 7.4% | | | | 20 | |
| EBR 11.4% | | | | | 20 |
| PARAPLEX ® G-60 | 30 | 30 | 30 | 30 | 30 |
| Zeosil ® 1165 MP | 70 | 70 | 70 | 70 | 70 |
| Vulcanox ® 4020 | 1 | 1 | 1 | 1 | 1 |
| SANTOFLEX ® 13 | 2 | 2 | 2 | 2 | 2 |
| Poliplastol ® | 3 | 3 | 3 | 3 | 3 |

EBR: epoxidized polybutadiene with degrees of epoxidation ranging from 2.2 mol % to 11.4 mol %, prepared as described above.

TABLE 3

| Example | 7 | 8 | 9 | 10 | 11 |
|---|---|---|---|---|---|
| 100% load (MPa) | 2.5 | 2.44 | 3.14 | 4.31 | 5.36 |
| 300% load (MPa) | 8.9 | 8.86 | 10.94 | 13.86 | 17.54 |
| Stress at break (MPa) | 14.8 | 14.81 | 15.46 | 18.74 | 15.93 |
| Elongation at break | 499 | 498.8 | 460.9 | 447.9 | 294.4 |
| IRHD hardness at 23° C. (degrees) | 80 | 80.2 | 81.4 | 85.5 | 84.9 |
| IRHD hardness at 100° C. (degrees) | 70 | 70 | 77.2 | 79.1 | 79.5 |
| E' 23° C. | 15.6 | 15.6 | 19.48 | 20.48 | 21.73 |
| E' 70° C. | 8.98 | 8.98 | 11.84 | 12.94 | 13.83 |
| tan delta 23° C. | 0.382 | 0.382 | 0.366 | 0.341 | 0.321 |
| tan delta 70° C. | 0.218 | 0.218 | 0.208 | 0.184 | 0.172 |
| DIN abrasion | 90 | 89.7 | 90.7 | 93.2 | 98.3 |

The invention claimed is:

1. A process for producing a tyre for a vehicle wheel, comprising:
   manufacturing the tyre, wherein the tyre comprises at least one crosslinkable elastomeric material;
   moulding the tyre in a cavity defined in a vulcanization mould; and
   crosslinking the at least one elastomeric material by heating the tyre to a predetermined temperature for a predetermined time;

wherein the at least one elastomeric material comprises:
  at least one elastomeric polymer comprising carboxylic groups; and
  at least one epoxidized elastomeric polymer comprising greater than or equal to 0.1 mol % and less than or equal to 20 mol % of epoxide groups relative to a total number of moles of monomers present in the at least one epoxidized elastomeric polymer;
wherein crosslinking the at least one elastomeric material is carried out substantially in an absence of additional crosslinking agents.

2. The process of claim 1, wherein crosslinking the at least one elastomeric material comprises heating the at least one elastomeric material to a temperature of at least 120° C. for a time of at least 3 minutes.

3. The process of claim 1, wherein crosslinking the at least one elastomeric material comprises heating the at least one elastomeric material to a temperature greater than or equal to 130° C. and less than or equal to 230° C. for a time greater than or equal to 5 minutes and less than or equal to 90 minutes.

4. The process of claim 1, wherein the at least one elastomeric material further comprises reinforcing filler.

5. The process of claim 4, wherein an amount of the reinforcing filler is greater than or equal to 10 phr and less than or equal to 120 phr.

6. The process of claim 4, wherein an amount of the reinforcing filler is greater than or equal to 30 phr and less than or equal to 100 phr.

7. The process of claim 1, wherein the at least one elastomeric material further comprises a lubricant.

8. The process of claim 7, wherein the lubricant comprises at least one epoxidized lubricant comprising epoxide groups located internally on molecules of the at least one epoxidized lubricant.

9. The process of claim 8, wherein the at least one epoxidized lubricant comprises an epoxide equivalent weight greater than or equal to 40 and less than or equal to 2,000.

10. The process of claim 7, wherein the lubricant comprises epoxidized oil.

11. The process of claim 7, wherein the lubricant comprises an epoxidized diene oligomer.

12. The process of claim 1, wherein the at least one elastomeric polymer comprising carboxylic groups comprises one or more homopolymers or copolymers comprising at least 0.1 mol % of carboxylic groups relative to a total number of moles of monomers in the at least one elastomeric polymer comprising carboxylic groups.

13. The process of claim 1, wherein the at least one elastomeric polymer comprising carboxylic groups comprises one or more homopolymers or copolymers comprising greater than or equal to 1 mol % and less than or equal to 30 mol % of carboxylic groups relative to a total number of moles of monomers in the at least one elastomeric polymer comprising carboxylic groups.

14. The process of claim 1, wherein the at least one elastomeric polymer comprising carboxylic groups comprises one or more homopolymers or copolymers comprising greater than or equal to 2 mol % and less than or equal to 10 mol % of carboxylic groups relative to a total number of moles of monomers in the at least one elastomeric polymer comprising carboxylic groups.

15. The process of claim 1, wherein the at least one elastomeric polymer comprising carboxylic groups comprises an average molecular weight greater than or equal to 2,000 and less than or equal to 1,000,000.

16. The process of claim 1, wherein the at least one elastomeric polymer comprising carboxylic groups comprises an average molecular weight greater than or equal to 50,000 and less than or equal to 500,000.

17. The process of claim 1, wherein the at least one elastomeric polymer comprising carboxylic groups is obtained by polymerization or copolymerization of one or more conjugated diene monomers, optionally mixed with monovinylarenes, polar comonomers, or monovinylarenes and polar comonomers, followed by carboxylation.

18. The process of claim 1, wherein the at least one elastomeric polymer comprising carboxylic groups is obtained by copolymerization of a conjugated diene, optionally mixed with monovinylarenes, polar comonomers, or monovinylarenes and polar comonomers, and an olefinic monomer comprising one or more carboxylic groups or carboxylic derivatives such as anhydrides, esters, nitriles, or amides.

19. The process of claim 1, wherein the at least one elastomeric polymer comprising carboxylic groups is obtained by copolymerization of one or more monoolefins with an olefinic comonomer comprising one or more carboxylic groups or carboxylic derivatives such as anhydrides, esters, nitriles, or amides.

20. The process of claim 1, wherein the at least one epoxidized elastomeric polymer comprises greater than or equal to 0.5 mol % and less than or equal to 15 mol % of epoxide groups relative to the total number of moles of monomers in the at least one epoxidized elastomeric polymer.

21. The process of claim 1, wherein the at least one epoxidized elastomeric polymer comprises greater than or equal to 1 mol % and less than or equal to 10 mol % of epoxide groups relative to the total number of moles of monomers in the at least one epoxidized elastomeric polymer.

22. The process of claim 1, wherein the at least one epoxidized elastomeric polymer comprises a glass transition temperature (Tg) less than 23° C.

23. The process of claim 1, wherein the at least one epoxidized elastomeric polymer comprises an average molecular weight greater than or equal to 2,000 and less than or equal to 1,000,000.

24. The process of claim 1, wherein the at least one epoxidized elastomeric polymer comprises an average molecular weight greater than or equal to 50,000 and less than or equal to 500,000.

25. The process of claim 1, wherein the at least one epoxidized elastomeric polymer is one or more epoxidized diene homopolymers or copolymers derived from one or more conjugated diene monomers, optionally copolymerized with monovinylarenes, polar comonomers, or monovinylarenes and polar comonomers.

26. The process of claim 1, wherein the at least one epoxidized elastomeric polymer comprises epoxidized natural rubber.

27. The process of claim 1, wherein the at least one epoxidized elastomeric polymer is obtained by copolymerization of a conjugated diene, optionally mixed with monovinylarenes, polar comonomers, or monovinylarenes and polar comonomers, and an olefinic monomer comprising one or more epoxide groups.

28. The process of claim 1, wherein the at least one epoxidized elastomeric polymer is a copolymer of one or more monoolef ins with an olefinic comonomer comprising one or more epoxide groups.

29. A tyre for a vehicle wheel, comprising:
one or more components made of at least one crosslinked elastomeric material;
wherein the at least one crosslinked elastomeric material comprises:
at least one elastomeric polymer comprising carboxylic groups; and
at least one epoxidized elastomeric polymer comprising greater than or equal to 0.1 mol % and less than or equal to 20 mol % of epoxide groups relative to a total number of moles-of monomers present in the at least one epoxidized elastomeric polymer;
wherein the elastomeric composition is crosslinked in a substantial absence of additional crosslinking agents.

30. The tyre of claim 29, wherein the at least one elastomeric material further comprises reinforcing filler.

31. The tyre of claim 30, wherein an amount of the reinforcing filler is greater than or equal to 10 phr and less than or equal to 120 phr.

32. The tyre of claim 30, wherein an amount of the reinforcing filler is greater than or equal to 30 phr and less than or equal to 100 phr.

33. The tyre of claim 29, wherein the at least one elastomeric material further comprises a lubricant.

34. The tyre of claim 33, wherein the lubricant comprises at least one epoxidized lubricant comprising epoxide groups located internally on molecules of the at least one epoxidized lubricant.

35. The tyre of claim 29, wherein the at least one elastomeric polymer comprising carboxylic groups comprises one or more homopolymers or copolymers comprising at least 0.1 mol % of carboxylic groups relative to a total number of moles of monomers in the at least one elastomeric polymer comprising carboxylic groups.

36. The tyre of claim 29, wherein the at least one epoxidized elastomeric polymer comprises greater than or equal to 0.5 mol % and less than or equal to 15 mol % of epoxide groups relative to the total number of moles of monomers in the at least one epoxidized elastomeric polymer.

37. A tyre for a vehicle, comprising:
a carcass structure;
a belt structure extended coaxially around the carcass structure; and
a tread band extended coaxially around the belt structure;
wherein the tread band comprises an external rolling surface intended to come into contact with the ground,
wherein the tread band comprises at least one crosslinked elastomeric material,
wherein the at least one crosslinked elastomeric material comprises:
at least one elastomeric polymer comprising carboxylic groups; and
at least one epoxidized elastomeric polymer comprising greater than or equal to 0.1 mol % and less than or equal to 20 mol % of epoxide groups relative to a total number of moles of monomers present in the at least one epoxidized elastomeric polymer;
wherein the at least one elastomeric material is crosslinked in a substantial absence of additional crosslinking agents.

38. The tyre of claim 37, wherein the at least one elastomeric material further comprises reinforcing filler.

39. The tyre of claim 38, wherein an amount of the reinforcing filler is greater than or equal to 10 phr and less than or equal to 120 phr.

40. The tyre of claim 38, wherein an amount of the reinforcing filler is greater than or equal to 30 phr and less than or equal to 100 phr.

41. The tyre of claim 37, wherein the at least one elastomeric material further comprises a lubricant.

42. The tyre of claim 41, wherein the lubricant comprises at least one epoxidized lubricant comprising epoxide groups located internally on molecules of the at least one epoxidized lubricant.

43. The tyre of claim 37, wherein the at least one elastomeric polymer comprising carboxylic groups comprises one or more homopolymers or copolymers comprising at least 0.1 mol % of carboxylic groups relative to a total number of moles of monomers in the at least one elastomeric polymer comprising carboxylic groups.

44. The tyre of claim 37, wherein the at least one epoxidized elastomeric polymer comprises greater than or equal to 0.5 mol % and less than or equal to 15 mol % of epoxide groups relative to the total number of moles of monomers in the at least one epoxidized elastomeric polymer.

* * * * *

UNITED STATES PATENT AND TRADEMARK OFFICE
CERTIFICATE OF CORRECTION

| | |
|---|---|
| PATENT NO. | : 7,144,465 B2 |
| APPLICATION NO. | : 10/468355 |
| DATED | : December 5, 2006 |
| INVENTOR(S) | : Marco Nahmias Nanni et al. |

It is certified that error appears in the above-identified patent and that said Letters Patent is hereby corrected as shown below:

Column 16, line 66, "monoolef ins" should read --monoolefins--.

Column 17, line 11, "moles-of" should read --moles of--.

Signed and Sealed this

Twenty-second Day of May, 2007

JON W. DUDAS
*Director of the United States Patent and Trademark Office*